Oct. 27, 1953  T. BISAGA ET AL  2,657,107
FOLDING TRAY STRUCTURE FOR AUTOMOBILE INSTRUMENT PANELS
Filed Nov. 28, 1951  2 Sheets-Sheet 2
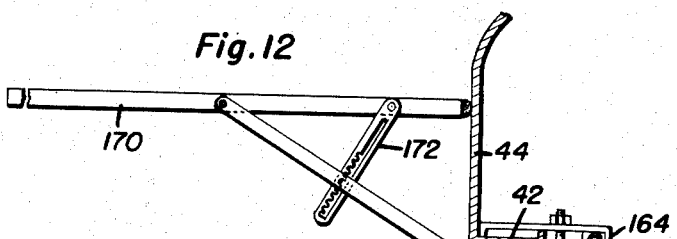
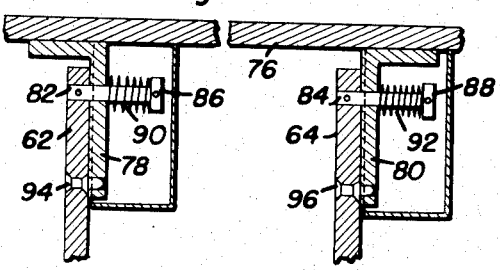
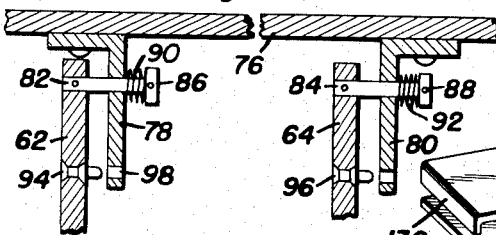
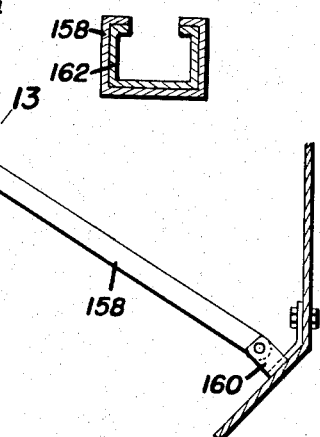
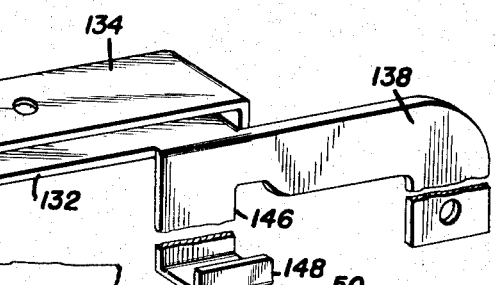
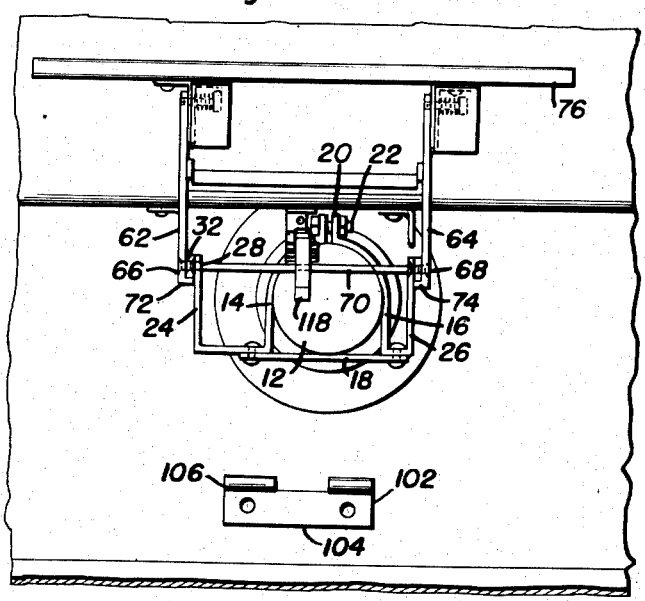
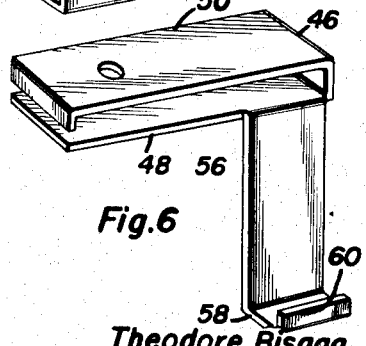
Theodore Bisaga
Dorothy Peczeniuk
INVENTORS Patented Oct. 27, 1953

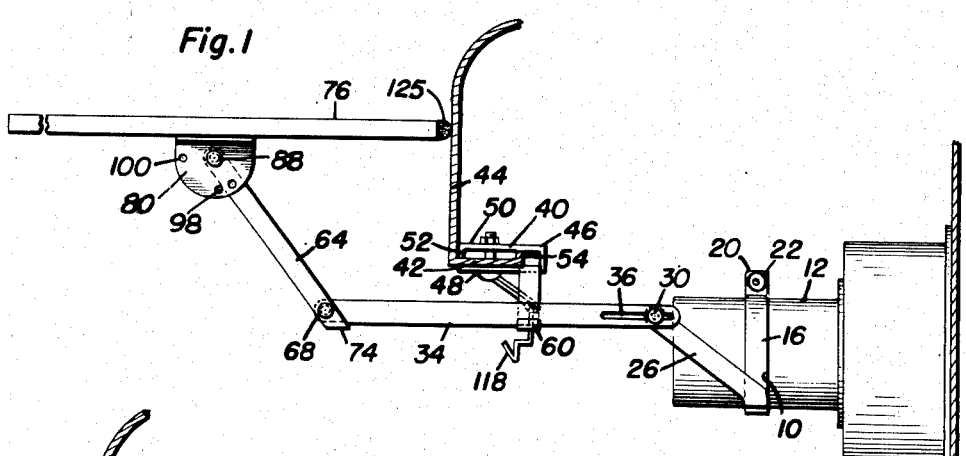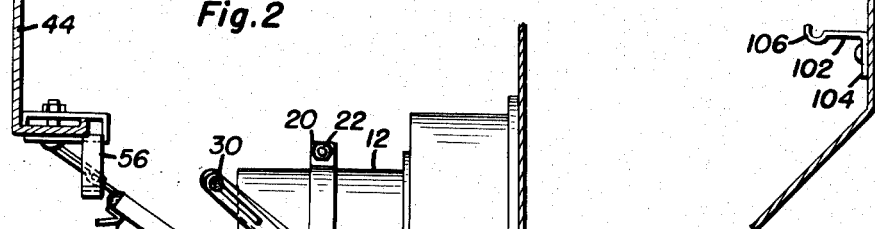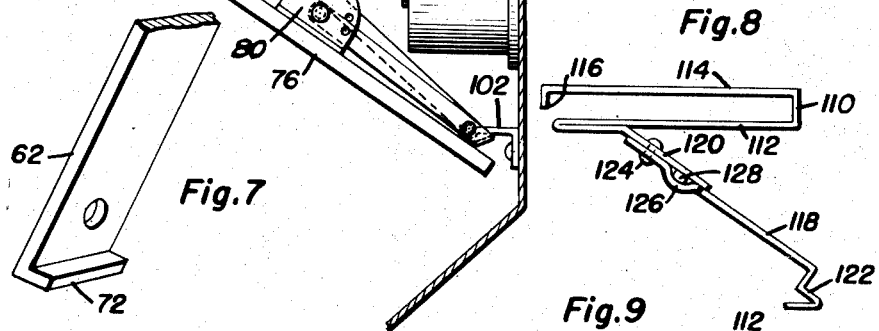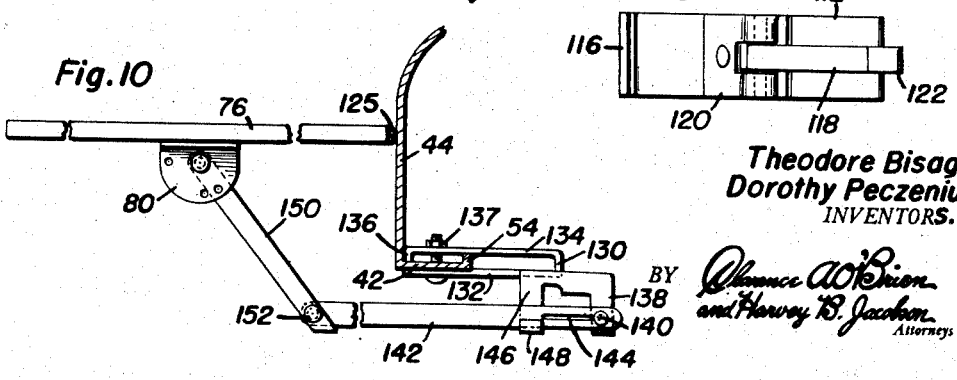

2,657,107

UNITED STATES PATENT OFFICE 2,657,107

FOLDING TRAY STRUCTURE FOR AUTOMOBILE INSTRUMENT PANELS

Theodore Bisaga and Dorothy Peczeniuk, Detroit, Mich.

Application November 28, 1951, Serial No. 258,608

11 Claims. (Cl. 311—21)

This invention relates to a tray for vehicles and particularly to a folding tray which can be mounted and stored under the instrument panel of a passenger automobile.

In the utilization of vehicles for long journeys or for business purposes it is frequently desirable to have a table in the forward compartment of the automobile on which to spread maps, make notes or even to each lunch. It has heretofore been extremely inconvenient to find a place to store or utilize maps or other devices in the forward seat of an automobile. The present invention provides a folding table or tray which can be mounted under the instrument panel of the automobile and when not in use can be folded out of the way or when in use can be rigidly supported in front of the user.

This invention provides a pair of pivots mounted below the instrument panel and having an extension arm pivotally mounted thereon with the table at the end of the pivot arm and having a pivotable adjustable connection therewith. Preferably a stabilizing hook device of some variety is applied at the front edge of the instrument panel so that the entire extension arm will be rigid and support the table in operative relation in front of the user.

Accordingly, an object of this invention is to provide an improved folding table.

It is a further object of this invention to provide a tray for use in a vehicle.

It is a further object of this invention to provide a folding tray which can be stored under the instrument panel of a motor vehicle.

It is a further object of this invention to provide a folding tray which is secured in a vehicle for convenient use of the passenger.

It is a further object of this invention to provide a tray clamp which can be readily applied to an automobile without marring or disturbing the finish thereof.

Other objects and many of the attendant advantages of this invention will be apparent from the following detailed description taken in conjunction with the accompanying drawing in which:

Figure 1 is a side elevation of the table in extended position;

Figure 2 is a side elevation of the table in folded position;

Figure 3 is a front elevation of the table in extended position;

Figure 4 is an enlarged sectional view through the table pivot plate showing the table in locked position;

Figure 5 is a view similar to Figure 4 with the carriage removed and the locking pin disengaged;

Figure 6 is an enlarged perspective view of the arm holding clamp;

Figure 7 is an enlarged perspective view of the table arm stop;

Figure 8 is an enlarged side elevational view of a spring clip;

Figure 9 is a bottom plan view of a spring clip for holding the table in folded position;

Figure 10 is a side elevation similar to Figure 1 and showing a preferred mounting bracket therefor;

Figure 11 is an enlarged perspective view of the mounting bracket of a modification according to Figure 10;

Figure 12 is a side elevation showing a modification according to the invention; and Figure 13 is a cross section through the telescoping support of Figure 12.

In the exemplification referring to Figures 1, 2 and 3 the folding tray comprises a bracket 10 which may be attached to any convenient article in the automobile such as the usual heater motor 12. The bracket is preferably constructed with a pair of arcuate side members 14 and 16 having a bottom arm 18 securely connected thereto and having a split portion 20 with a clamp bolt 22. The bracket is provided with upstanding arms 24 and 26 on which is mounted a pair of pivots 28 and 30. The pivots 28 and 30 are separated a material distance so as to provide a firm foundation and support for the folding tray.

A pair of extension arms 32 and 34 are pivotally mounted on the pivots 28 and 30 and the extension arms are also provided with an extension slot 36 so that the extension arms may slide with respect to the pivot pins. A clamp 40 is rigidly secured to the under edge of the front instrument panel 44. The bracket 40 preferably is constructed of a substantially U-shaped piece 46 having parallel arms 48 and 50 which are intended to underlie and overlie the inturned flange 42 of the panel 44 and the overlying member such as 50 is provided with a downturned flange 52 to compensate for the usual upturned flange 54 on the inturned edge of the panel. A depending hook member is rigidly secured to the rear portion of the U-shaped member preferably either being integral with or securely welded thereto. The hook member usually includes a depending arm 56 with a laterally offset portion 58 and upturned lip 60. When the folding table is elevated into operative relation the extension arm 34 is mounted in the hook portion 58 behind the lip 60 so that it is held in a substantially horizontal rigid position.

As all of the elements of the arms and mountings for the table are identical only one of the extension arms will be described. However, it will be understood that two or more extension arms or other elements are provided to provide a rigid firm mounting so that the table may be operatively engaged by a user without danger of tilting or other disturbance.

A pair of table arms 62 and 64 are provided on pivots 66 and 68 which are preferably the ends of a cross brace rod 70. The table arms 62 and 64 are provided with inturned edges 72 and 74 which are adapted to move in underlying relation with respect to the extension arms 32 and 34 to act as stops to prevent angular motion beyond a predetermined distance with respect to the arms 32 and 34. This construction provides the table arms extending in a desired angular relation with respect to the extension arms and moving in rigid engagement therewith to provide a substantially rigid arm from the pivot pins on the mounting bracket to the upper ends of the table arm. A table top 76 having a pair of depending pivot plates 78 and 80. The upper ends of the arms 62 and 64 are provided with pins 82 and 84. The pins 82 and 84 are rigidly secured in position either by welding or other means such as pins or rivets. The pivot pins 82 and 84 both extend in the same direction from the brackets 62 and 64 and at least one of the pins 82 or 84 is provided with a head 86 or 88 which is rigidly secured in place and preferably is removable by having a pin or screw connection. Resilient means such as springs 90 and 92 are interposed between the heads 86 and 88 and the plates 78 and 80 so that the plates are constantly resiliently urged into contact with the arms 62 and 64. The arms 62 and 64 are provided with locking pins 94 and 96 which are rigidly mounted in the arms as by riveting and extend outwardly into the path of the plates 78 and 80. The plates 78 and 80 are provided with a plurality of locking apertures 98 which can be selectively engaged with the pins 94 and 96. Because of the interdirectional arrangement of the pins 82 and 84 and the locking pins 94 and 96 the locking pins may be disengaged from the apertures 98 by lateral movement of the table with respect to the mounting arms. This is definitely shown in Figure 5 where the table is then moved laterally to compress the springs 90 and 92 and disengage the pins 94 and 96 from the apertures 98 so that the table may be pivoted about the pins 82 and 84 to any desired position.

To fold away the table 76 the table is shifted to disengage the locking pin and turned so that the locking pin will engage a special opening 100 so arranged that the table arm will be in substantial parallel relation to the table top. The extension arms are then disengaged from the hooks 58 and 60 and pivoted about the pivot pins 30 until the rod 70 is mounted in engaged relation with a bracket 102 having a flange 104 secured to the forward wall of the vehicle and having fingers 106 preferably of a resilient nature for gathering and collectively supporting the edge of the table 76. A bracket 110 is preferably U-shaped having a bottom portion 112 and an upper portion or leg 114 which respectively underlie and overlie the inturned edge 42 of the panel 44. The bracket 110 like the bracket 40 has an upper overlying leg 114 provided with downturned lip 116 to compensate for the rolled edge of the inturned edge 42. A spring clip 118 connected to the bracket 110 by any suitable means such as the depending lip 120. After the edge of the table has been engaged in the fingers 106 it is pressed upward under the dash and is contacted by the offset end 120 of the spring clip 118. Preferably the spring finger 118 may be oscillated about the pivot 124 and has a locking detent 126 engaging a finger 128 on the inturned lip 120.

The table 76 is preferably provided with a rubber pad 125 for engagement with the instrument panel 44 for the dual purpose of preventing marring of the panel by the edge of the table and for securely supporting the edge of the table against the panel.

In the preferred embodiment of the invention according to Figure 10 a mounting bracket 130 is provided with a lower leg member 132 which underlies the inturned edge 42 of the panel 44 and an upper leg member 134 which overlies the inturned edge and has a downturned lip 136 to match the upturned lip 54 of the inturned edge of the panel. Preferably the bracket 130 is attached to the inturned edge of the panel 44 by means of a screw threaded fastener such as bolt 137.

A depending pivot arm 138 is rigidly connected to the bracket 130 and is preferably integral therewith. The lower end of the pivot arm 138 is provided with a pivot pin 140 which is preferably rigidly secured thereto. An extension arm 142 corresponding to the extension 34 is mounted on the pivots 140 and has a slot 144 so that the extension arm is pivotally and slidably connected to the bracket. The bracket 130 is provided with a depending arm 146 having a hook 148 in which the extension arm 142 may be engaged to extend in a substantially horizontal position from underneath the instrument panel 44. Table arms 150 similar to the table arms 62 and 64 are pivotally connected to the ends of the arms 142 by means of the pivot rod 152. The upper ends of the table arms 152 are pivotally attached to the pivot plates 78 or 80 in a manner described in connection with Figures 1 to 3, and particularly as described in Figures 4 and 5.

The modification according to Figures 12 and 13 shows an extension arm 158 has the lower end thereof mounted in a bracket 160 rigidly secured under the instrument panel of the automobile and preferably at the junction of the fire wall and the foot board extension. The extension rod 158 has an inner member 162 which is telescopically slidable therein. A bracket 164 clampingly engages the inner edge of the panel 44 and has a depending guide member 166 secured thereto and engaging the collapsible telescoping member 158. A table top 170 pivotally connected to the upper end of the extension 162 and a bracket 172 is provided in locking engagement between the extension portion 162 and the table top 170.

It will thus be seen that this invention provides a collapsible table which may be conveniently mounted and stored under the instrument panel of an automobile and extended into operative position so that the occupants of the automobile may have the convenience of the table top for disposing things thereon or for making notes or other purposes.

While for purposes of exemplification particular embodiments of the invention have been shown, and described according to the best present understanding thereof, it will be apparent that many changes and modifications can be made therein, without departing from the true spirit of the invention or the scope of the appended claims.

Having described the invention, what is claimed as new is:

1. A tray for mounting in a vehicle comprising a pivot anchored on said vehicle under the instrument panel, an extension arm pivotally and slidably mounted on said pivot, an arm holding clamp mounted on the instrument panel of said vehicle, a depending hook on said clamp, said arm being receivable in said hook, a table arm pivotally mounted on the end of said extension arm, a stop limiting the rotation of said table arm with respect to said extension arm, a table pivotally mounted on said table arm, means for locking said table with respect to said table arm.

2. A tray for mounting in a vehicle comprising a pivot anchored on said vehicle under the instrument panel, an extension arm pivotally and slidably mounted on said pivot, an arm holding clamp mounted on the instrument panel of said vehicle, an arm supporting hook on said clamp, a table arm pivotally mounted on the end of said extension arm, a stop limiting the rotation of said table arm with respect to said extension arm, a table pivotally mounted on said table arm, a pivot plate secured to said table, a pivotal connection between said table arm and said pivot plate, a separable locking means engaging said arm and said plate.

3. A tray for mounting in a vehicle comprising a pivot anchored on said vehicle under the instrument panel, an extension arm pivotally and slidably mounted on said pivot, an arm holding clamp mounted on the instrument panel of said vehicle, a depending hook on said clamp adapted to support said arm, a table arm pivotally mounted on the end of said extension arm, a stop limiting the rotation of said table arm with respect to said extension arm, a table pivotally mounted on said table arm, a pivot plate secured to said table, a pivotal connection between said table arm and said pivot plate, a separable locking means engaging said arm and said plate, resilient means urging said plate and said arm into locking engagement.

4. A tray for mounting in a vehicle comprising a pivot anchored on said vehicle under the instrument panel, an extension arm pivotally and slidably mounted on said pivot, an arm holding clamp mounted on the instrument panel of said vehicle, a table arm pivotally mounted on the end of said extension arm, a stop limiting the rotation of said table arm with respect to said extension arm, a table pivotally mounted on said table arm, a pivot plate secured to said table, a pivotal connection between said table arm and said pivot plate, a pin rigidly mounted in said table arm, said plate having a plurality of openings selectively engageable with said pin to determine the angular relation of said plate to said arm.

5. A tray for mounting under the instrument panel of a motor vehicle comprising a bracket rigidly mounted under the instrument panel of said vehicle, a pivot on said bracket, an extension arm pivotally mounted on said pivot, an arm holding clamp mounted on the bottom of the instrument panel of the vehicle, means carried by said clamp engaging said extension arm, a table arm pivotally mounted on said extension arm, a table member, a pivot plate mounted on said table member, a pivot pin secured in said table arm, said pivot plate being journaled on said pivot pin.

6. A tray for mounting under the instrument panel of a motor comprising a bracket rigidly mounted under the instrument panel of said vehicle, a pivot on said brackets, an extension arm pivotally mounted on said pivot, an arm holding clamp mounted on the bottom of the panel of the vehicle, means carried by said clamp engaging said extension arm, a table arm pivotally mounted on said extension arm, a table member, a pivot plate mounted on said table, a pivot pin secured in said table arm, said pivot plate being journaled on said pivot pin, a head on said pivot pin, a spring on said pin between said head and said plate, said spring urging said plate towards said arm.

7. A tray for mounting under the instrument panel of a motor comprising a bracket rigidly mounted under the instrument panel of said vehicle, a pivot on said bracket, an extension arm pivotally mounted on said pivot, an arm holding clamp mounted on the bottom of the instrument panel of the vehicle, means carried by said clamp engageable with said extension arm, a table arm mounted on said extension arm, a table member, a pivot plate mounted on said table, a pivot pin secured in said table arm, said pivot plate being journaled on said pivot pin, a head on said pivot pin, a spring on said pin between said head and said plate, said spring urging said plate towards said arm, a lock pin rigidly secured in said arm, said plate having a plurality of openings selectively engageable with said lock pin.

8. A folding tray for attachment to a motor vehicle having an instrument panel comprising a pair of spaced apart pivot members secured on said vehicle in forwardly spaced relation to the instrument panel, a pair of parallel disposed extension arms pivoted on said pivot members, a pair of spaced apart hook members secured below the instrument panel, table arms pivotally connected on said extension arms, a stop means for limiting the angular movement between said table arms and said extension arms, pivot pins anchored adjacent the ends of said table arms, said pins extending in the same direction from the respective arms, a pair of pivot plates secured to said table, said pivot plates being journaled on said pins, separable locking means adjustably securing said plates in adjusted relation to said table arms.

9. A folding tray for attachment to a motor vehicle having an instrument panel comprising a pair of spaced apart pivot members secured on said vehicle in the space under the instrument panel, a pair of parallel disposed extension arms pivoted on said pivot members, a pair of spaced apart hook members secured on the instrument panel, table arms pivotally connected on said extension arms, stop means for limiting the angular movement between said table arms and said extension arms, pivot pins anchored adjacent the ends of said table arms, said pins extending in the same direction from the respective arms, a pair of pivot plates secured to said table, said pivot plates being journaled on said pins, a head on at least one of said pivot pins, resilient means on said pin between said head and the pivot plate, separable locking means securing said pivot plates in adjusted relation to said table arms.

10. A folding tray for attachment to a motor vehicle having an instrument panel comprising a pair of spaced apart pivot members secured on said vehicle in proximity to said instrument panel, a pair of parallel disposed extension arms pivoted on said pivot members, a pair of spaced apart hook members secured on the instrument panel, table arms pivotally connected on said extension arms, stop means for limiting the angular movement between said table arms and said extension arms, pivot pins anchored adjacent the ends of said table arms, said pins extending in the same direction from the respective arms, a pair of pivot plates secured to said table, said pivot plates being journaled on said pins, a head on at least one of said pivot pins, resilient means on said pin between said head and the pivot plate, a locking pin in each of said table arms, said pivot plate having apertures selectively engaging said pins, said pins extending in the same direction from said arms whereby a single lateral movement of said table in opposition to said resilient means disengages both of said pivot plates from said locking pins.

11. A folding tray for mounting in a vehicle of the passenger type comprising a mounting bracket, clamp means securing said bracket to the bottom edge of the instrument panel of said vehicle, a depending pivot arm on the end of the bracket remote from the panel, a pivot secured in said bracket, an extension arm pivotally and slidably mounted on said pivot, a depending hook secured on said bracket in spaced relation to said pivot arm, said extension arm being engageable in said hook, a table arm pivotally mounted on said extension arm, the end of said table arm being offset to engage said extension arm for firmly relating said table arm to said extension arm, a table top, a pivotal connection between said table top and said table arm, and locking means releasably securing said table top in adjusted relation to said table arm.

THEODORE BISAGA.
DOROTHY PECZENIUK.

References Cited in the file of this patent

UNITED STATES PATENTS

| Number | Name | Date |
|---|---|---|
| 363,393 | Kidder | May 17, 1887 |
| 828,965 | Pike | Aug. 21, 1906 |
| 1,261,611 | Polyak | Apr. 2, 1918 |
| 1,293,631 | Diou | Feb. 4, 1919 |
| 1,430,016 | Koltunski | Sept. 26, 1922 |
| 1,679,715 | Fish | Aug. 7, 1928 |
| 2,125,476 | Westrope et al. | Aug. 2, 1938 |